United States Patent [19]
Abe et al.

[11] Patent Number: 5,467,846
[45] Date of Patent: Nov. 21, 1995

[54] DISC BRAKE ASSEMBLY

[75] Inventors: Kazuo Abe; Masashi Ishihara; Hitoshi Ikeuchi; Shinsuke Sugano, all of Toyota; Toshiharu Okuda, Susono; Shigemi Sakakibara, Numazu; Hidetoshi Shimizu, Mishima; Yasuaki Ichiba, Susono, all of Japan

[73] Assignee: Toyota Jidosha Kabushiki Kaisha, Aichi, Japan

[21] Appl. No.: 241,713

[22] Filed: May 12, 1994

[30] Foreign Application Priority Data

May 13, 1993 [JP] Japan ................. 5-111762
Dec. 15, 1993 [JP] Japan ................. 5-315231

[51] Int. Cl.⁶ ........................................ F16D 65/38
[52] U.S. Cl. ........................ 188/73.37; 188/73.45
[58] Field of Search ................. 188/73.36, 73.37, 188/73.39, 73.45

[56] References Cited

U.S. PATENT DOCUMENTS

| | | |
|---|---|---|
| 3,677,373 | 7/1972 | Lucien . |
| 3,768,605 | 10/1973 | Carre . |
| 3,893,547 | 7/1975 | Schanz . |
| 5,125,482 | 6/1992 | Negishi ............ 188/73.39 X |
| 5,205,383 | 4/1993 | Terashima ............ 188/73.45 |

FOREIGN PATENT DOCUMENTS

| | | | |
|---|---|---|---|
| 115453 | 8/1984 | European Pat. Off. ........ 188/73.45 | |
| 2138457 | 1/1973 | France . | |
| 2201735 | 4/1974 | France . | |
| 2038649 | 2/1971 | Germany . | |
| 2211013 | 9/1973 | Germany . | |
| 3402866 | 9/1984 | Germany .................. | 188/73.37 |
| 4010461 | 10/1991 | Germany . | |
| 57-55550 | 12/1982 | Japan . | |
| 172026 | 7/1988 | Japan .................... | 188/73.45 |
| 2042108 | 9/1980 | United Kingdom ......... | 188/73.37 |
| 2161226 | 1/1986 | United Kingdom . | |

*Primary Examiner*—Robert J. Oberleitner
*Assistant Examiner*—Kevin D. Rutherford
*Attorney, Agent, or Firm*—Oliff & Berridge

[57] ABSTRACT

In a disc brake assembly including a caliper member mounted on a vehicle body structure in such a manner as to straddle a portion of a rotary brake disc secured for a road wheel, a friction pad supported on the caliper member by means of a pair of hanger pins to be moved toward and away from one side surface of the brake disc for engagement therewith and disengagement therefrom, the friction pad having a backing plate secured thereto to be engaged at one side end face thereof with a torque receiving portion of the caliper member in braking operation and a fluid actuator mounted within the caliper member to press the friction pad against the one side surface of the brake disc, a side projection is provided on at least an upper or lower portion of the one side end face of the backing plate for engagement with the torque receiving portion of the caliper member or on at least an upper or lower portion of the torque receiving portion of the caliper member for engagement with the one side face of said backing plate. The side projection is arranged to apply a rotational force to the backing plate in a rotational direction of the brake disc when engaged with the torque receiving portion of the caliper member or engaged with the one side end face of the backing plate.

4 Claims, 9 Drawing Sheets

DISC BRAKE ASSEMBLY

BACKGROUND OF THE INVENTION

1. Field of the Invention

The present invention relates to a disc brake assembly in which a friction pad is applied to one or each side surface of a rotary brake disc secured for rotation with a road wheel of a wheeled vehicle, and more particularly to an improvement in the disc brake assembly for reducing braking noises caused by vibration of the friction pad.

2. Description of the Prior Art

Figure 14A:
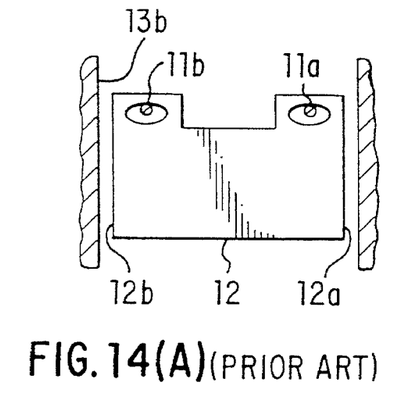
FIGS. 14(A) and 14(B) illustrate movement of a backing plate of a Friction pad in a conventional disc brake assembly.
Figure 14B:
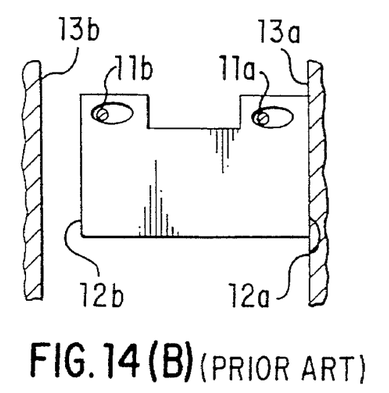

Disclosed in Japanese Utility Model Publication No. 570 is a disc brake assembly of this kind which includes a caliper member mounted on a vehicle body structure in such a manner as to straddle a portion of a rotary brake disc secured for rotation with a road wheel, a pair of friction pads supported on the caliper member by means of a pair of hanger pins and opposed to each side surface of the brake disc to be moved toward and away from the brake disc, and a pair of fluid actuators mounted within the caliper member to press tile friction pads against each side surface of tile brake disc. In the conventional disc brake assembly, as shown in FIG. 14(A), a backing plate 12 of the friction pad carried by hanger pins 11a, 11b is drawn in a rotational direction of the brake disc when the friction pad is pressed into contact with the brake disc by depression of a brake pedal. In this instance, as shown in FIG. 14(B), the backing plate 12 is engaged at its one side end face with a torque receiving portion 13a formed on an inside face of the caliper member, while the other side end face 12b of the backing plate 12 is separated from a torque receiving portion 13b formed on the opposite inside face of the caliper member. This causes vibration of the friction pad in the axial direction of hanger pins 11a, 11b, resulting in occurrence of braking noises in braking operation.

SUMMARY OF THE INVENTION

It is, therefore, a primary object of the present invention to provide an improved disc brake assembly wherein tile backing plate of the friction pad is applied with a rotational force in braking operation and engaged at its different two positions with the caliper member or a member assembled therewith to restrain vibration of the friction pad for reducing tile braking noises.

According to the present Invention, the object is attained by providing a disc brake assembly for a wheeled vehicle which includes a caliper member mounted on a vehicle body structure in such a manner as to straddle a portion of a rotary brake disc secured for a road wheel of the vehicle, a friction pad supported on the caliper member by means of a pair of hanger pins to be moved toward and away from one side surface of the brake disc for engagement therewith and disengagement therefrom, the friction pad having a backing plate secured thereto to be engaged at one side end face thereof with a torque receiving portion of the caliper member, and a fluid actuator mounted within the caliper member to press tile friction pad against the one side surface of the brake disc, wherein a side projection is provided on at least an upper or lower portion of the one side end face of the backing plate for engagement with the torque receiving portion of the caliper member or on at least an upper or lower portion of the torque receiving portion of the caliper member for engagement with the one side end face of the backing plate. The side projection is arranged to apply a rotational force to the backing plate in a rotational direction of the brake disc when engaged with the torque receiving portion of the caliper member or engaged with the one side end face of the backing plate.

BRIEF DESCRIPTION OF THE DRAWINGS

Additional objects, features and advantages of the present invention will be more readily appreciated from the following detailed description of certain preferred embodiments and modifications thereof when considered with reference to tile accompanying drawings, in which:

FIGS. 8(A) to 8(C), 9(A) to 9(C), 10(A) to 10(C, 11(A), 11(B), and 12 illustrate modifications of the disc brake assembly;

DESCRIPTION OF THE PREFERRED EMBODIMENTS

Figure 1:
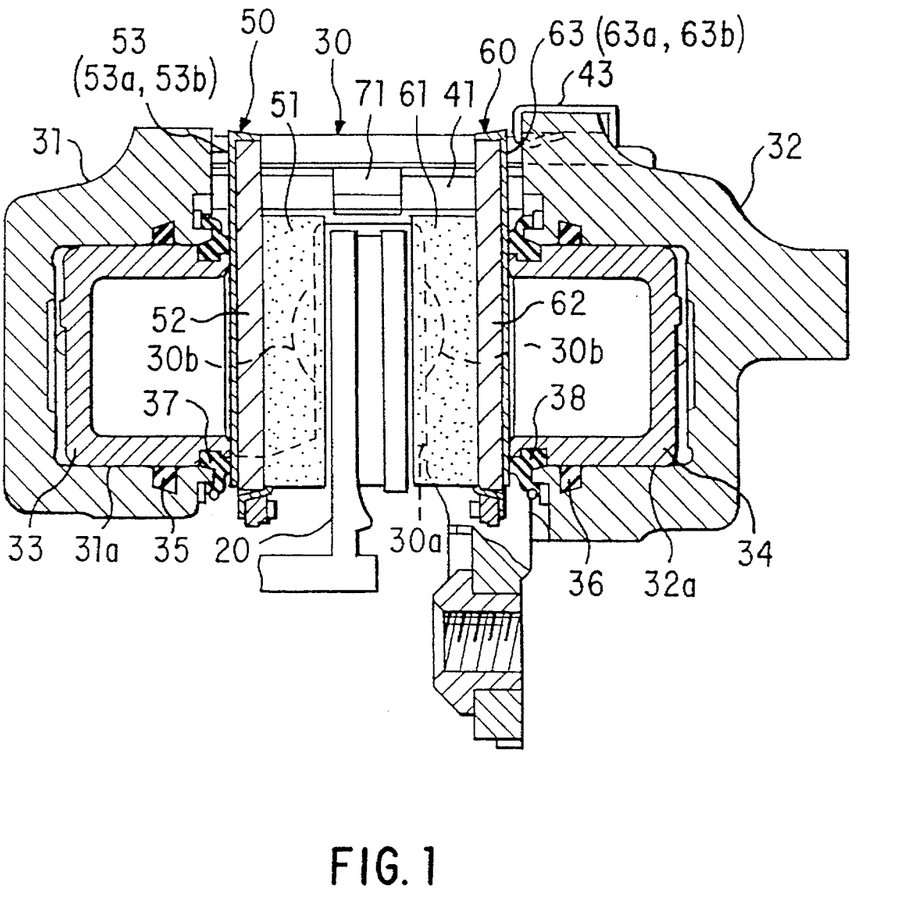
FIG. 1 is a sectional view of a disc brake assembly in accordance with the present invention.
Figure 2:
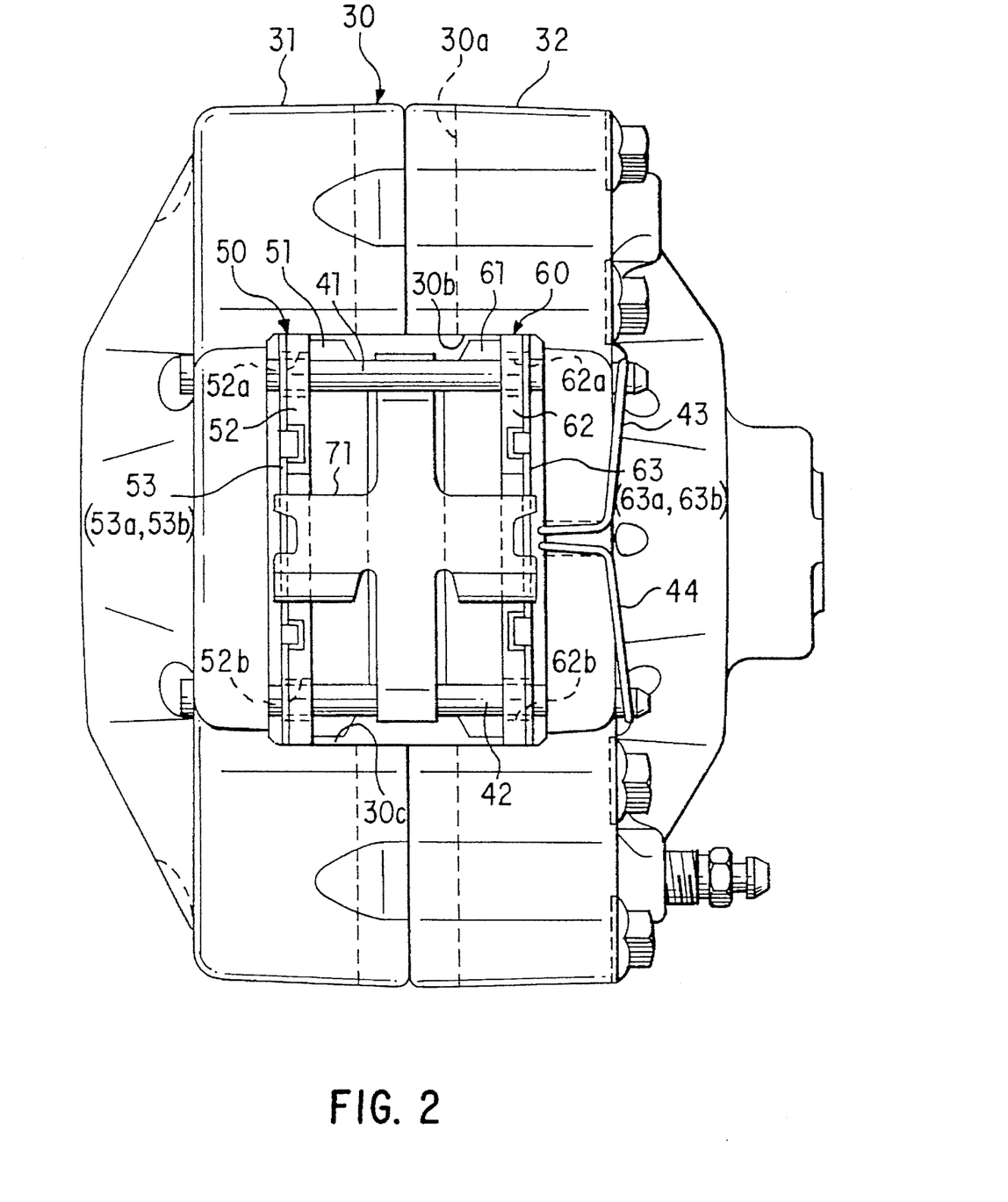
FIG. 2 is a plan view of the disc brake assembly shown in FIG. 1.

In FIGS. 1 and 2 of the drawings, there is illustrated a first embodiment of a disc brake assembly in accordance with the present invention. The disc brake assembly includes a rotary brake disc 20 of the ventilated type secured for rotation with a road wheel of a wheeled vehicle and a caliper member 30 mounted on a vehicle body structure in such a manner as to straddle the brake disc 20. The caliper member 30 has a pair of arm portions 31, 32 which are jointed at their upper portions in a circumference direction of tile brake disc 20 to form a vertical rectangular cavity at the center of caliper member 30 and to form a circumference passage 30a of the brake disc 20. Formed within the arm portions 31, 32 are cylinders 31a, 32a which are opposed to each side face of the brake disc 20. Pistons 33, 34 are slidably disposed in a liquid-tight manner within the cylinders 31a, 32a respectively through rubber seal rings 35, 36. Boots 37, 38 are assembled with each inside end of cylinders 31a, 32a and each inside end of pistons 33, 34 to prevent entry of foreign particles into the cylinders 31a, 32a.

At the upper portion of caliper member 30, a pair of parallel hanger pins 41, 42 are fixed at opposite ends thereof to the arm portions 31, 32 of caliper member 30 and located above the brake disc 20. The hanger pins 41, 42 are retained in place by means of legs 43, 44 of a retainer spring engaged with the arm portion 32 of caliper member 30. A pair of friction pads 50, 60 are carried by the hanger pins 41, 42 and positioned between each side face of tile brake disc 20 and the pistons 33, 34. The friction pads 50, 60 are spaced in a slight clearance at their opposite side end faces from respective torque receiving portions 30b, 30c formed by internal walls of the central cavity of caliper member 30. Thus, the torque receiving portions 30b, 30c are applied with a braking torque through the friction pads 50, 60 in braking operation of the road wheel.

The friction pads 50, 60 each are composed of pad members 51, 61, backing plates 52, 62 and shim plates 53, 63. The pad members 51, 61 each are made of heat-insulating material such as a material of asbestos resin mold type and opposed to the brake disc 20 at their front surfaces. The backing plates 52, 62 each are formed larger in a vertical width than the pad members 51, 61 and secured to each rear surface of the pad members 51, 61 at a downwardly displaced position. The backing plates 52, 62 each are formed at their upper portions with a pair of laterally elongated holes 52a, 52b; 62a, 62b which formed larger in diameter than the hanger pins 41, 42 and spaced to correspond with the hanger pins 41, 42. Thus, the hanger pin 41 is extended through tile elongated holes 52a, 62a with a clearance, while the hanger pin 42 is extended through the elongated holes 52b, 62b with a clearance. The shim plates 53, 63 each are composed of first and second shim plates 53a, 53b; 63a, 63b overlapped at each rear surface of backing plates 52, 62.

Figure 3A:
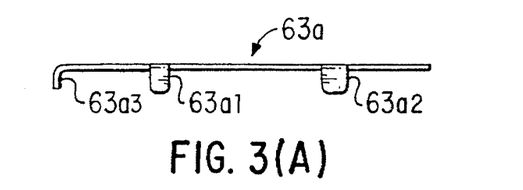
FIG. 3(A) is a plan view of a first shim plate shown in FIGS. 1 and 2.
Figure 3B:
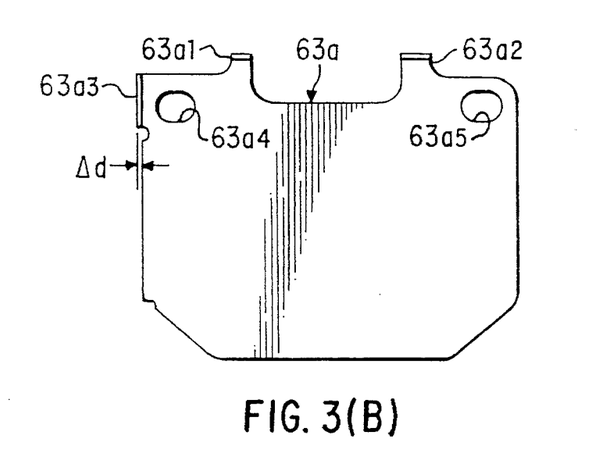
FIG. 3(B) is a front view of the first shim plate.
Figure 3C:
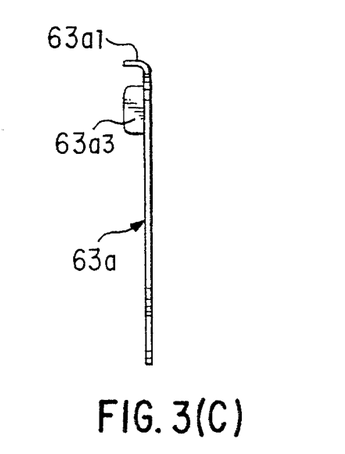
FIG. 3(C) is a side view of the first shim plate.

The first shim plates 53a, 63a each are made of thin stainless sheet metal and coated with rubber to attenuate vibration thereof. As shown in FIGS. 3(A) to 3(B), the first shim plate 63a has an upper end formed with a pair of spaced upper lugs 63a1, 63a2 and a side end formed with a side lug 63a3. The first shim plate 63a is attached to the rear surface of the backing plate 62 and fixed to the backing plate 62 at its lugs 63a1, 63a2, 63a3 in such a manner that the side end face of first shim plate 63a is projected at its upper portion by thickness Δd (for instance, 0.6 mm) of side lug 63a3. The first shim plate 63a is formed at its upper portion with a pair of laterally elongated holes 63a4, 63a5 which correspond with the elongated holes 62a, 62b of backing plate 62. Thus, the hanger pins 41, 42 are extended through the elongated holes 63a4, 63a5 with a clearance. The first shim plate 53a is formed symmetrically with the first shim plate 63a.

Figure 4A:
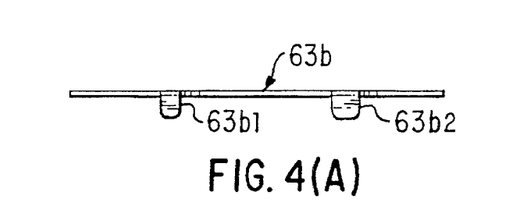
FIG. 4(A) is a plan view of a second shim plate shown in FIGS. 1 and 2.
Figure 4B:
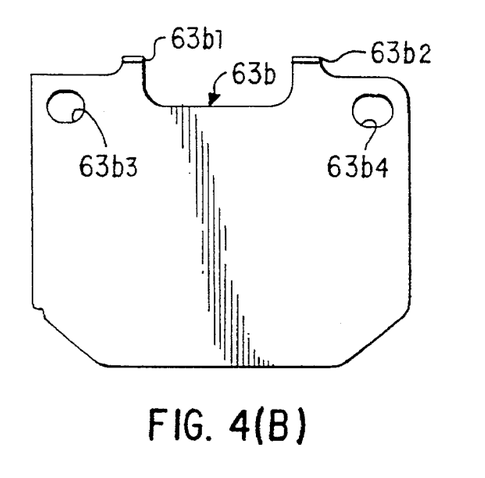
FIG. 4(B) is a front view of the second shim plate.
Figure 4C:
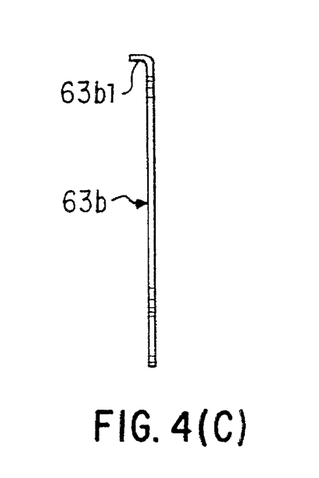
FIG. 4(C) is a side view of the second shim plate.

The second shim plates 53b, 63b each are made of thin stainless sheet metal to prevent the pad members 51, 61 and backing plates 52, 62 from damage caused by impact against the pistons 33, 34. As shown in FIGS. 4(A) to 4(C), the second shim plate 63b is formed at its upper end with a pair of spaced upper lugs 63b1, 6362 which are engaged with the backing plate 62 to fix the second shim plate 63b to the rear surface of backing plate 62 through the first shim plate 63a. The second shim plate 63b is formed at its upper portion with a pair of laterally elongated holes 6363, 6364 which correspond with the elongated holes 62a, 62b of backing plate 62. The second shim plate 53b is formed symmetrically with the second shim plate 63b. As shown in FIG. 2 assembled with the caliper member 30 is a cross-spring 71 which is engaged at Its rear end with a central portion of hanger pin 41 and at its front end with a central portion of hanger pin 42 to bias the pad members 51, 61 downwardly in a forward direction.

Figure 5A:
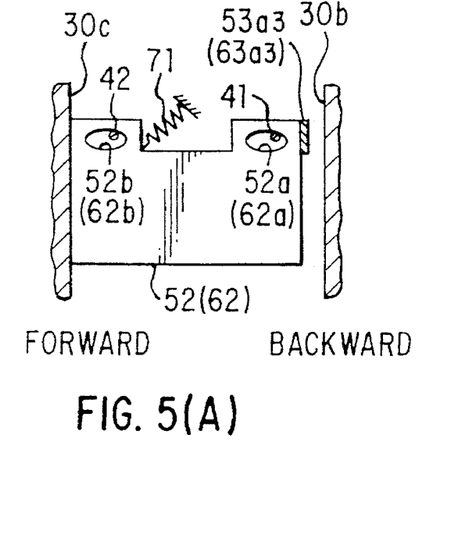
FIGS. 5(A) and 5(B) illustrate movement of backing plates in braking operation during forward travel of a vehicle.

Hereinafter, operation of the disc brake assembly will be described with reference to FIGS. 5(A) and 5(B). When the cylinders 31a, 32a are applied with hydraulic braking pressure by depression of a brake pedal (not shown), the pistons 33, 34 are moved inwardly to press the pad members 51, 61 of friction pads 50, 60 against the brake disc 20 for applying a braking force to the road wheel. Assuming that the pad members 51, 61 of friction pads 50, 60 have been pressed into contact with the brake disc 20 by depression of the brake pedal during forward travel of the vehicle, the backing plates 52, 62 of friction pads 50, 60 are drawn forward as shown in FIG. 5(A) in the rotational direction of brake disc 20 and engaged with the forward torque receiving portion 30c of caliper member 30 at their forward side end faces so that the forward torque receiving portion 30c is applied with a braking torque of the road wheel. In this instance, the backing plates 52, 62 are moved in parallel under the biasing force of cross-spring 71 acting thereon downwardly in the forward direction. Thus, the elongated holes 52a, 62a of backing plates 52, 62 are pressed against the hanger pin 41 at their upper portions to cause sliding resistance between the backing plates 52, 62 and support pin 41, while the backing plates 52, 62 are applied with a friction force by engagement with the forward torque receiving portion 30c. This is effective to restrict vibration of the backing plates 52, 62 in the axial direction of the hanger pins 41, 42 and to reduce braking noises caused by vibration of the friction pads 50, 60.

Figure 5B:
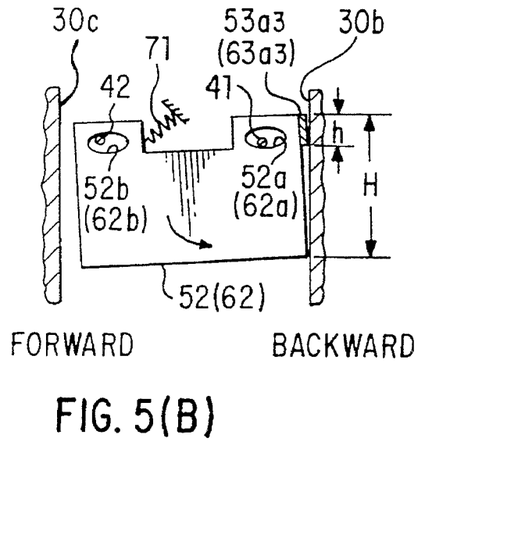

When the pad members 51, 61 of friction pads 50, 60 are pressed into contact with the brake disc 20 during backward movement of the vehicle, the backing plates 52, 62 of friction pads 50, 60 are drawn backward as shown in FIG. 5(B). In this instance, the first shim plates 53a, 63a are engaged with the backward torque receiving portion 30b of caliper member 30 at their side lugs 53a3, 63a3 so that the backward torque receiving portion 30b is applied with a braking torque of the road wheel. Thus, the backing plates 52, 62 are applied with a rotational force caused by rotation of the brake disc 20 in a direction shown by an arrow in FIG. 5(B), and the lower portions of backing plates 52, 62 are moved by the rotational force toward the backward torque receiving portion 30b. As a result, the elongated holes 52b, 62b of backing plates 52, 62 are pressed against the hanger pin 42 at their upper portions to cause sliding resistance between the backing plates 52, 62 and hanger pin 42, while the backing plates 52, 62 are applied with a friction force by engagement with the backward torque receiving portion 30b. This is effective to restrict vibration of the backing plates 52, 62 in the axial direction of hanger pins 41, 42 and to reduce braking noises caused by vibration of the friction pads 50, 60.

Figure 6A:
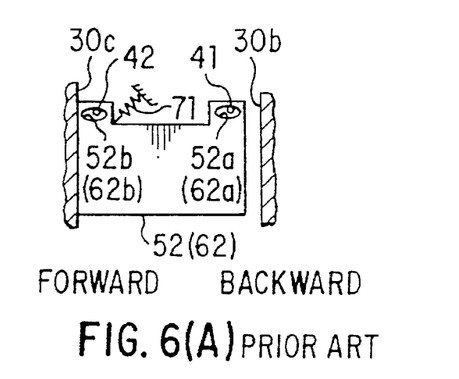
FIGS. 6(A) to 6(C) illustrate movement of backing plates in a conventional disc brake assembly.
Figure 6B:
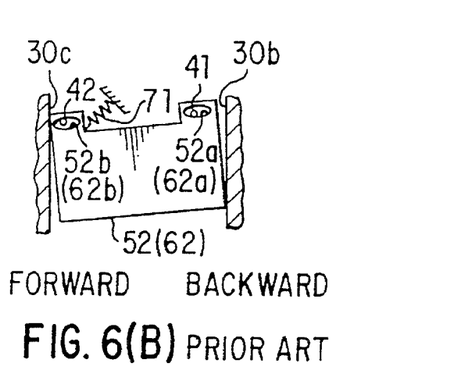
Figure 6C:
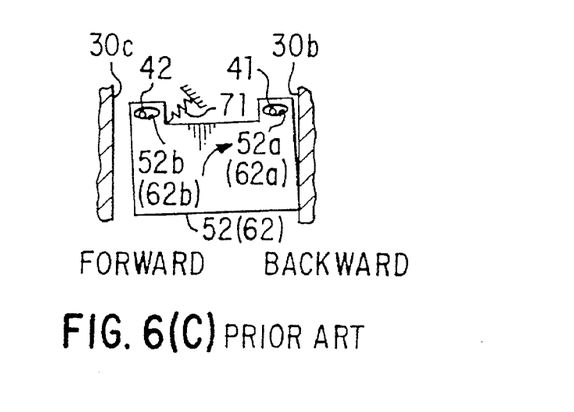

The foregoing facts will be readily understood when compared with movement of the backing plates 52, 62 in a conventional disc brake assembly in which the backing plates 52, 62 are assembled without providing any projection at their side ends as shown in FIG. 6(A). Assuming that tile backing plates 52, 62 in the conventional disc brake assembly have been applied with a backward force in braking operation of the vehicle, as shown in FIG. 6(B), the backing plates 52, 62 are engaged with the backward torque receiving portion 30b at their lower ends under the biasing force of cross-spring 71. Thus, the backing plates 52, 62 are rotated against the biasing force of cross-spring 71 in a direction shown by an arrow in FIG. 6(C). In this instance, the elongated holes 52b, 62b of backing plates 52, 62 are disengaged from the hanger pin 42 to release the frictional engagement of the backing plates 52, 62 and hanger pin 42. This causes free movement of backing plates 52, 62 at their forward portions. As a result, the friction pads 50, 60 are vibrated in the axial direction to cause braking noises in tile braking operation.

Figure 7:
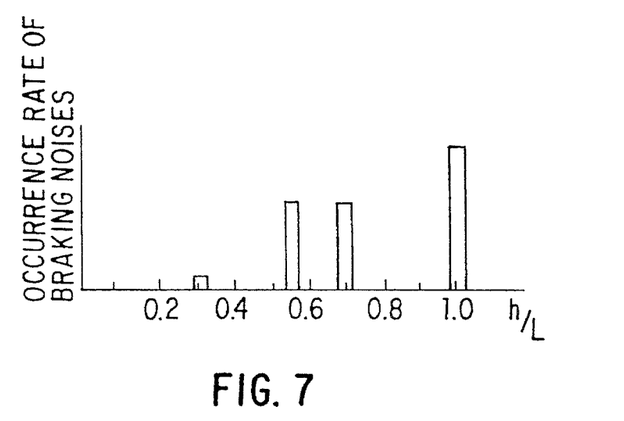
FIG. 7 is a graph showing the occurrence rate of braking noises in relation to width of a side lug formed at a side end face of the first shim plate shown in FIGS. 3(A) to 3(C);.

To examine the occurrence rate of braking noises in braking operation, the inventors changed the width "h" of side lugs 53a3, 63a3 of first shim plates 53, 63 to change a ratio of the width "h" to tile height "H" of backing plates 52, 62 to "0.3", "0.55", "0,7" and "1.0". A result of the test is shown in FIG. 7.

Figure 8A:
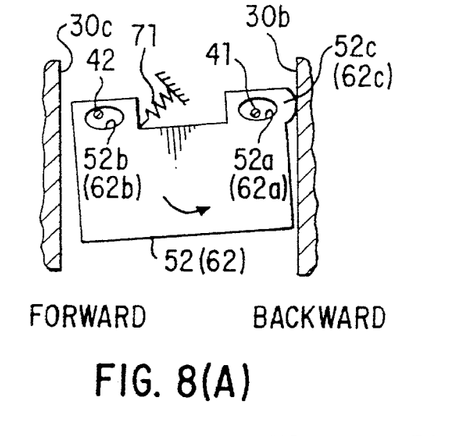
Figure 8B:
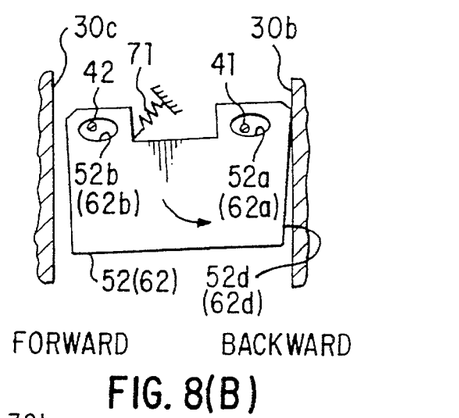
Figure 8C:
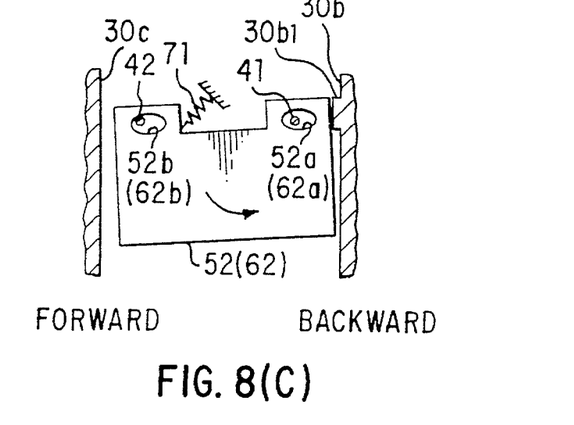

In practical embodiments of the present invention, the disc brake assembly may be modified as shown in FIGS. 8(A) to 8(C). In FIG. 8(A), the backward side end faces of backing plates 52, 62 are formed with side projections 52c, 62c respectively at their upper portions without providing the shim plates 53, 63. In FIG. 8(B), the backward side end faces of backing plates 52, 62 are obliquely cut away at their lower portions 52d, 62d without providing the shim plates 53, 63. In this modification, tile lower portions 52d, 62d of backing plates are cut away in such a manner that the backward side end faces of backing plates 52, 62 are protruded at their upper portions. In FIG. 8(C), the backward torque receiving portion 30b of caliper member 30 is formed at its upper portion with projections 30b1 for engagement with the backward side end faces of backing plates 52, 62 without forming any projection on the side end faces of backing plates 52, 62. In these modifications, the backing plates 52, 62 are applied with a rotational force in a direction shown by an arrow respectively in the figures when drawn backward and engaged with the backward torque receiving portion 30b in braking operation.

Figure 9A:
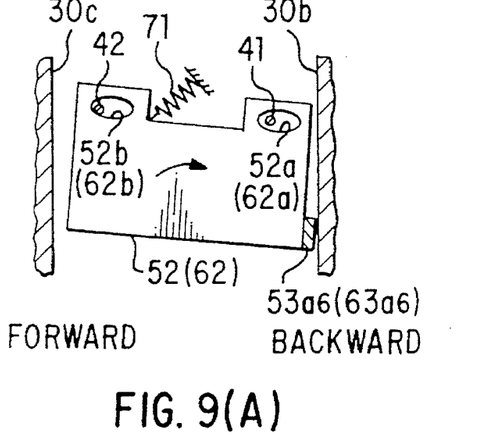
Figure 9B:
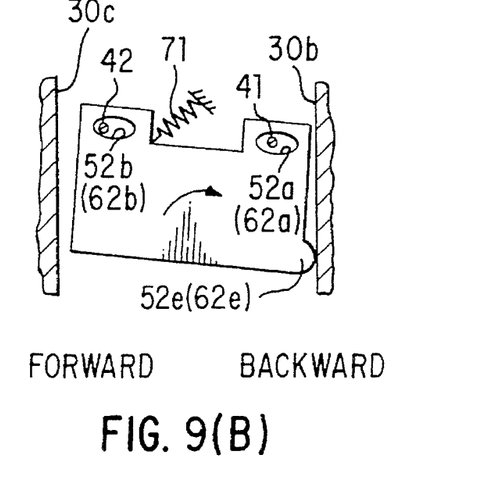
Figure 9C:
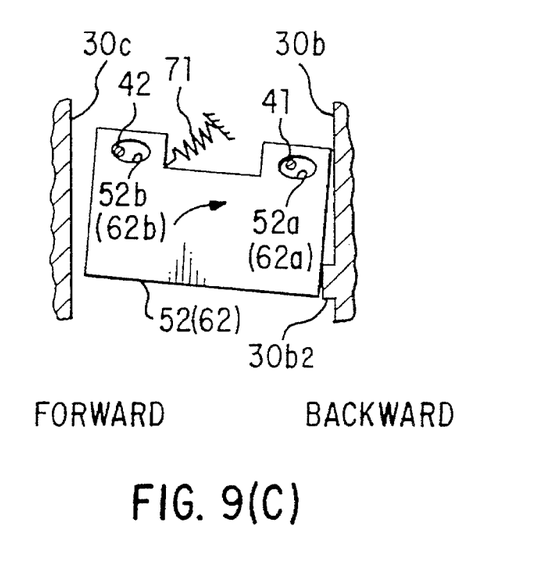

In addition, the disc brake assembly of the present invention may be modified as shown in FIGS. 9(A) to 9(C). In FIG. 9(A), the first shim plates 53, 63 of friction pad 50, 60 are formed with side lugs 53a, 63a respectively at their lower portions without forming the side lugs 53a, 63a at their upper portions. In FIG. 9(B), the backward side end faces of backing plates 52, 62 are formed with side projections 52e, 62e respectively at their lower portions without providing the first shim plates 53, 63. In FIG. 9(C), the backward torque receiving portion 30b of caliper member 30 is Formed with projections 30b2 for engagement with the backward side end faces of backing plates 52, 62 without providing tile first shim plates 53, 63. In these modifications, the backing plates 52, 62 are applied with a rotational force in a direction shown by an arrow respectively in the figures when drawn backward and engaged with the backward torque receiving portion 30 of caliper member 30 In braking operation. In this case, the backing plates 52, 62 are rotated in the arrow direction more than in the conventional disc brake assembly shown in FIGS. 6(A) to 6(C). Thus, the elongated holes 52b, 62b of backing plates 52, 62 are pressed against the support pin 42 at their lower portions to cause sliding resistance between the backing plates 52, 62 and support pin 42. This is effective to restrict vibration of the backing plates 52, 62 in tile axial direction and to reduce braking noises caused by vibration of the friction pads 50, 60.

Figure 10A:
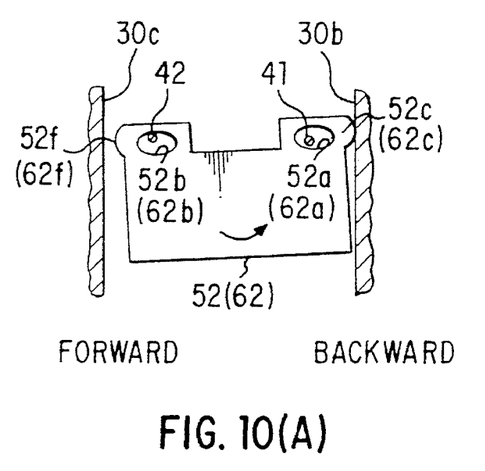
Figure 10B:
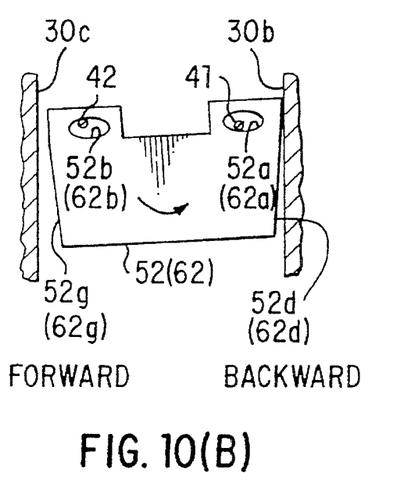
Figure 10C:
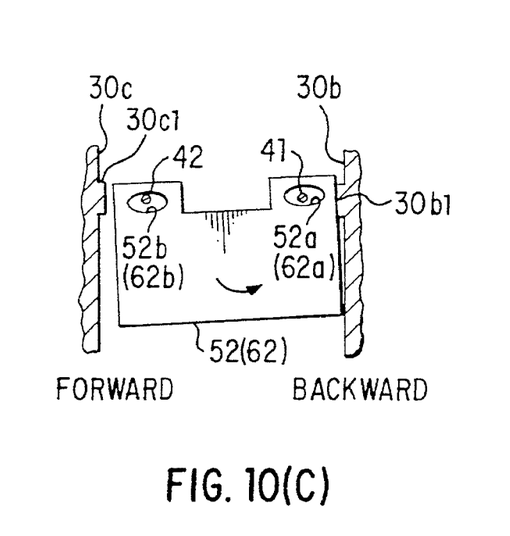

Although in the above embodiment and modifications, the cross-spring 71 is provided to bias the backing plates 52, 62 downwardly In the forward direction, the cross-spring 71 may be removed or the spring coefficient of the cross-spring 71 may be decreased in a small value. In the case that the cross-spring 71 has been removed or the spring coefficient of cross spring 71 has been decreased in a small value, the disc brake assembly of the present invention may be modified as shown in FIGS. 10(A) to 10(C). In FIG. 10(A), the opposite side end faces of the respective backing plates 52, 62 are formed with side projections 52c, 62c; 52f, 62f respectively their upper portions. In FIG. 10(B), the opposite side end faces of tile respective backing plates 52, 62 are cut away obliquely at their lower portions 52d, 62d; 52g, 62g. In FIG. 10(C), the backward torque receiving portion 30b of caliper member 30 is formed at its upper portion with side projections 30b1 for engagement with the backward side end faces of backing plates 52,62, while the forward torque receiving portion 30c of caliper member 30 is formed at its upper portion with side projections 30c1 for engagement with the forward side end faces of backing plates 52, 62. In these modifications, tile backing plates 52, 62 are applied with a rotational force in a direction shown by an arrow respectively in the figures when drawn backward and engaged with the backward torque receiving portion 30b of caliper member 30. When the backing plates 52, 62 are drawn forward and engaged with the forward torque receiving portion 30c, they are applied with a rotational force in a reverse direction. Thus, there will occur sliding resistance between the backing plates 52, 62 and support pin 41 or 42 when the backing plates 52, 62 are drawn backward or forward in braking operation. This is effective to reduce braking noises caused by vibration of the friction pads in braking operation.

Figure 11A:
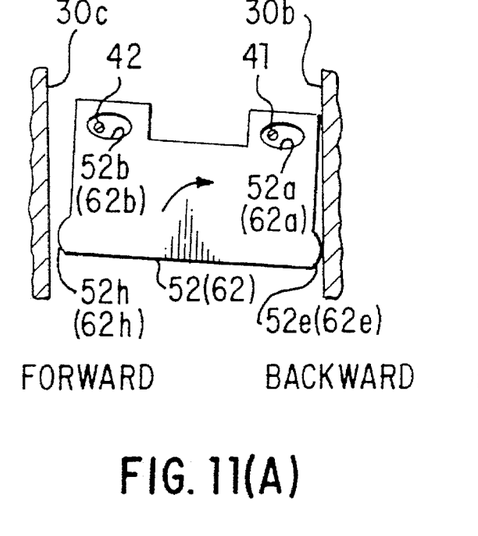
Figure 11B:
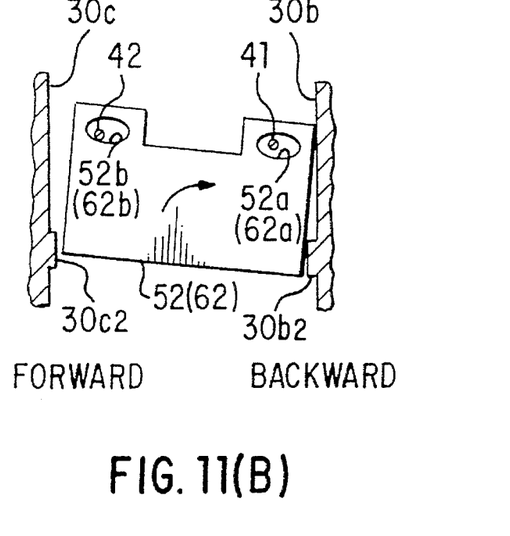

In the case that the cross spring 71 has been removed or the spring coefficient of cross spring 71 has been decreased in a small value, the disc brake assembly of the present invention may be further modified as shown in FIGS. 11(A) and 11(B). In FIG. 11(A), tile opposite side end faces of tile respective backing plates 52, 62 are formed with side projections 52e, 62e; 52h, 62h respectively at their lower portions. In FIG. 11(B), the backward torque receiving portion 30b of caliper member 30 is formed at its lower portion with side projections 30b2 for engagement with the backward side end faces of backing plates 52, 62, while the forward torque receiving portion 30c of caliper member 30 is formed at its lower portion with side projections 30c2 for engagement with the forward side end faces of backing plates 52, 62. In these modifications, the backing plates 52, 62 are applied with a rotational force in a direction shown by an arrow respectively in the figures when drawn backward and engaged with the backward torque receiving portion 30b of caliper member 30. When the backing plates 52, 62 are drawn forward and engaged with the forward torque receiving portion 30c of caliper member 30, they are applied with a rotational force in a reverse direction. Thus, there will occur sliding resistance between tile backing plates 52, 62 and support pines 41, 42 when the backing plates 52, 62 are drawn backward or forward.

Figure 12:
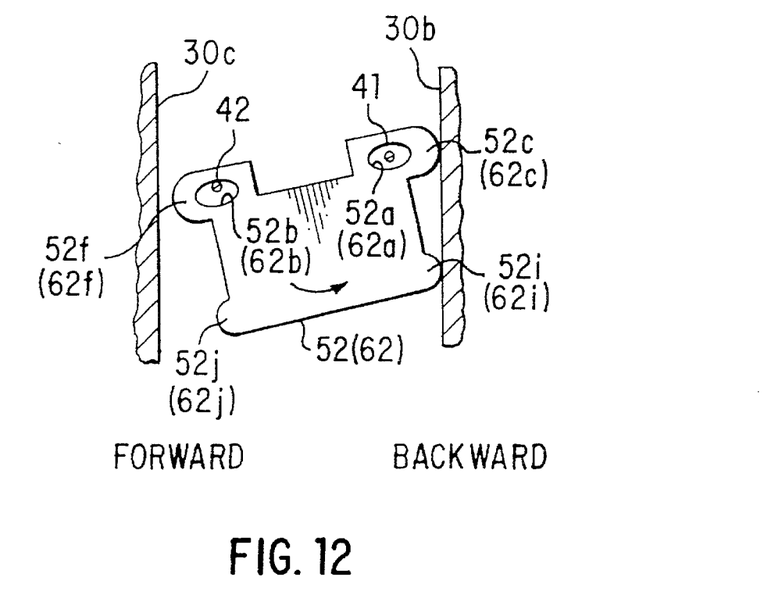

In the case that the cross spring 71 has been removed or the spring coefficient of cross spring 71 has been decreased in a small value, the disc brake assembly of the present invention may be further modified as shown in FIG. 12, wherein the opposite side end faces of the respective backing plates 52, 62 are formed at their upper portions with side projections 52c, 62c; 52f, 62f and formed at their lower portions with side projections 52i, 62i; 52j, 62j smaller than the side projections 52c, 62c; 52f, 62f. In this modification, the backing plates 52, 62 are applied with a rotational force in a direction shown by an arrow in tile figure when drawn backward and engaged with the backward torque receiving portion 30b of caliper member 30 at their side projections 52c, 62c. This causes sliding resistance between tile backing plates 52, 62 and hanger pin 42 and between the side projections 52i, 62i of backing plates 52, 62 and the backward torque receiving portion 30b of caliper member 30. This is effective to reduce the load acting on tile support pin 42. When the backing plates 52, 62 are drawn forward and engaged with the forward torque receiving portion 30c of caliper member 30 at their side projections 52f, 62f, they are applied with a rotational force in a reverse direction to cause sliding resistance between the backing plates 52, 62 and hanger pin 41 and between the side projections 52j, 62j and the forward torque receiving portion 30c of caliper member 30. This is effective to reduce braking noises caused by vibration of the friction pads in braking operation.

As is understood from the above description, the embodiments and modifications of the present invention are characterized in that tile shim plates 53, 63 or backing plates 52, 62 each are provided at their upper or lower side end faces with a side projection for engagement with tile forward or backward torque receiving portion 30c or 30b of the caliper member 30 located in a rotational direction of the brake disc 20 or characterized in that the forward or backward torque receiving portion 30c or 30b of the caliper member 30 is provided with side projections for engagement with tile upper or lower side end faces of the backing plates 52, 62. In braking operation, the backing plates 52, 62 are applied with a rotational force in the rotational direction of the brake disc 20 when engaged with the forward or backward torque receiving portion 30c or 30b of the caliper member 30 at the side projections, In this instance, tile elongated holes 52a, 52b of backing plates 52, 62 are maintained in engagement with the hanger pin 41 or 42 under the rotational force applied to the backing plates 52, 62. Thus, the hanger pin 41 or 42 acts as a restriction portion to restrict movement of the backing plates 52, 62 in the axial direction at a different position apart from the torque receiving portion of the caliper member 30. As a result, vibration of the friction pads 50, 60 are restrained at the different two positions to reduce braking noises in braking operation.

Figure 13A:
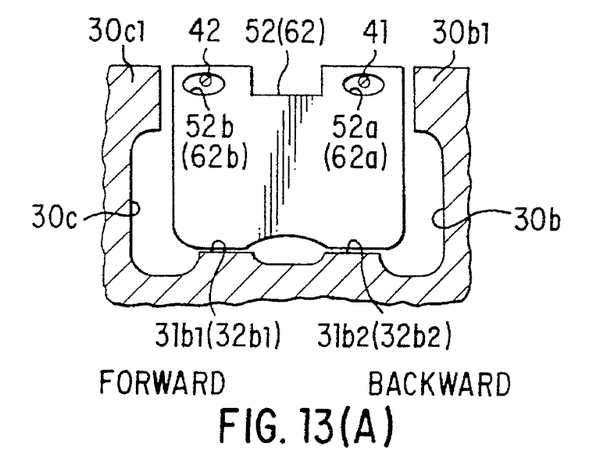
FIGS. 13(A) and 13(B) illustrate a second embodiment of the present invention.
Figure 13B:
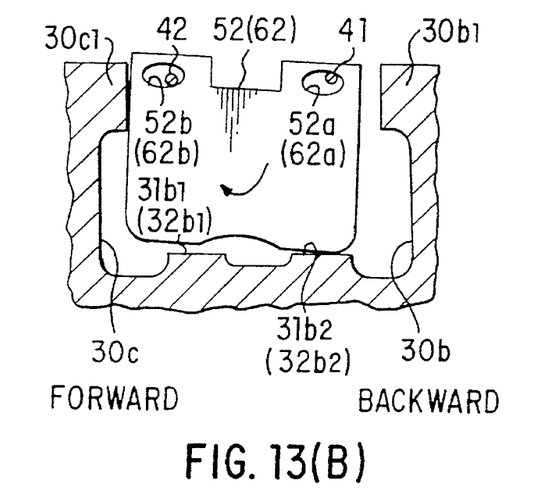

FIGS. 13(A) and 13(B) there is illustrated a second embodiment of the present invention, wherein the arm portions 31, 32 of the caliper 30 are axially inwardly extended at their bottom portions to form support portions 31b1, 32b1; 3162, 3262 respectively opposed to the bottom ends of backing plates 52, 62, and wherein the forward and backward torque receiving portions 30b, 30c of caliper member 30 are formed with side projections 30b1, 30c1 respectively at their upper portions. In a released condition of the brake pedal, the backing plates 52, 62 are positioned as shown in FIG. 13(A). Assuming that the friction pads 50, 60 have been pressed into contact with the brake disc 20 by depression of the brake pedal during forward travel of the vehicle, the backing plates 52, 62 are drawn forward and engaged with the side projection 30c1 formed on the forward torque receiving portion 30c. In this instance, as shown in FIG. 13(B), the backing plates 52, 62 are rotated by a rotational force applied from the brake disc 20 in a direction shown by an arrow in the figure and engaged at their bottom ends with the support portions 3162, 3262. Thus, movement of the backing plates 52, 62 is restricted at the two positions of the side projection 30c1 and support portions 3162, 3262 to reduce vibration of the friction pads 50, 60. When the brake pedal has been depressed during backward movement of the vehicle, the backing plates 52, 62 are drawn backward and engaged with the side projection 30b1 formed on tile backward torque receiving portion 30b. In this instance, the backing plates 52, 62 are rotated by a rotational force applied from the brake disc 20 in a reverse direction and engaged at their bottom ends with the support portions 31b1, 32b1. Thus, movement of the backing plates 52, 62. is restricted at the two positions of the side projection 30b1 and support portions 31b1, 32b1 to restrain vibration of the friction pads 50, 60.

What is claimed is:

1. A disc brake assembly for a wheeled vehicle including a caliper member mounted on a vehicle body structure in such a manner as to straddle a portion of a rotary brake disc secured for a road wheel of tile vehicle, a friction pad supported on said caliper member to be moved toward and away from one side surface of said brake disc in an axial direction for engagement therewith and disengagement therefrom, said friction pad having a backing plate and at least one shim-after "plate" secured thereto by hanger pins accommodated in elongated holes within the backing plate, the backing plate to be engaged at one side end face thereof with a torque receiving portion of said caliper member in braking operation, and a fluid actuator mounted within said caliper member to press said friction pad against the one side surface of said brake disc,     wherein a side projection is provided on at least an upper or lower portion of the one side end face of said backing plate for engagement with the torque receiving portion of said caliper member or on at least an upper or lower portion of the torque receiving portion of said caliper member for engagement with tile one side end face of said backing plate or on a side end surface of said at least one shim, said side projection being arranged to apply a rotational force to said backing plate in a rotational direction of said brake disc when engaged with the torque receiving portion of said caliper member or engaged with tile one side end face of said backing plate and the abutment of the hanger pins to the perimeter of the elongated holes assisted by a spring, provide resistance to the rotational force.

2. A disc brake assembly as claimed in claim 1, wherein said side projection is formed on one side end face of said at least one shim attached to said backing plate.

3. A disc brake assembly as claimed in claim 1, wherein said side projection is formed on one side end face of said backing plate.

4. A disc brake assembly as claimed in claim 1, wherein said side projection is formed on an upper portion of the torque receiving portion of said caliper member, and wherein said caliper member is formed at a bottom portion thereof with a support portion to be engaged with a bottom end of said backing plate when the one side end face of said backing plate is engaged with said side projection.

\* \* \* \* \*